S. GARGIULO.
MACHINE FOR PRODUCING RADIATOR TUBING FOR AUTOMOBILES.
APPLICATION FILED AUG. 19, 1915.
1,225,730.
Patented May 8, 1917.
3 SHEETS—SHEET 1.
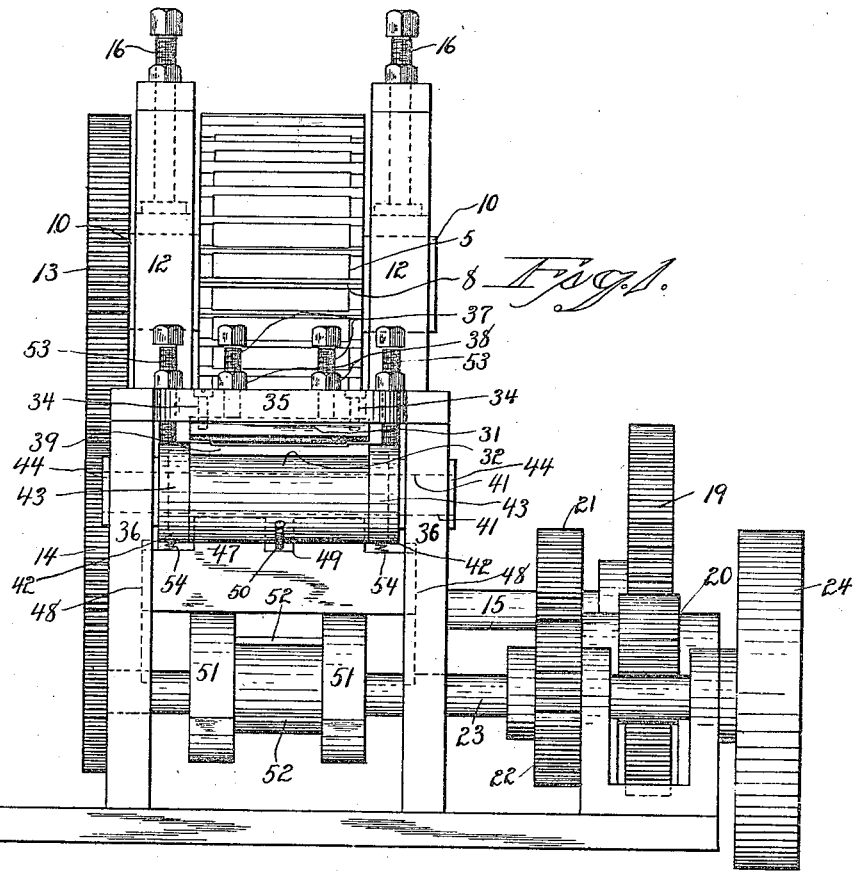
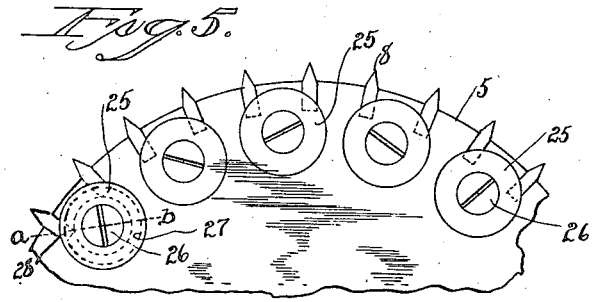
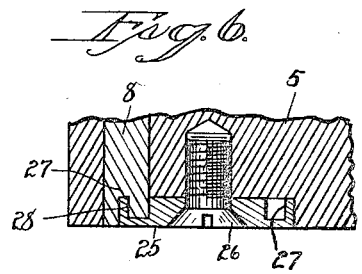

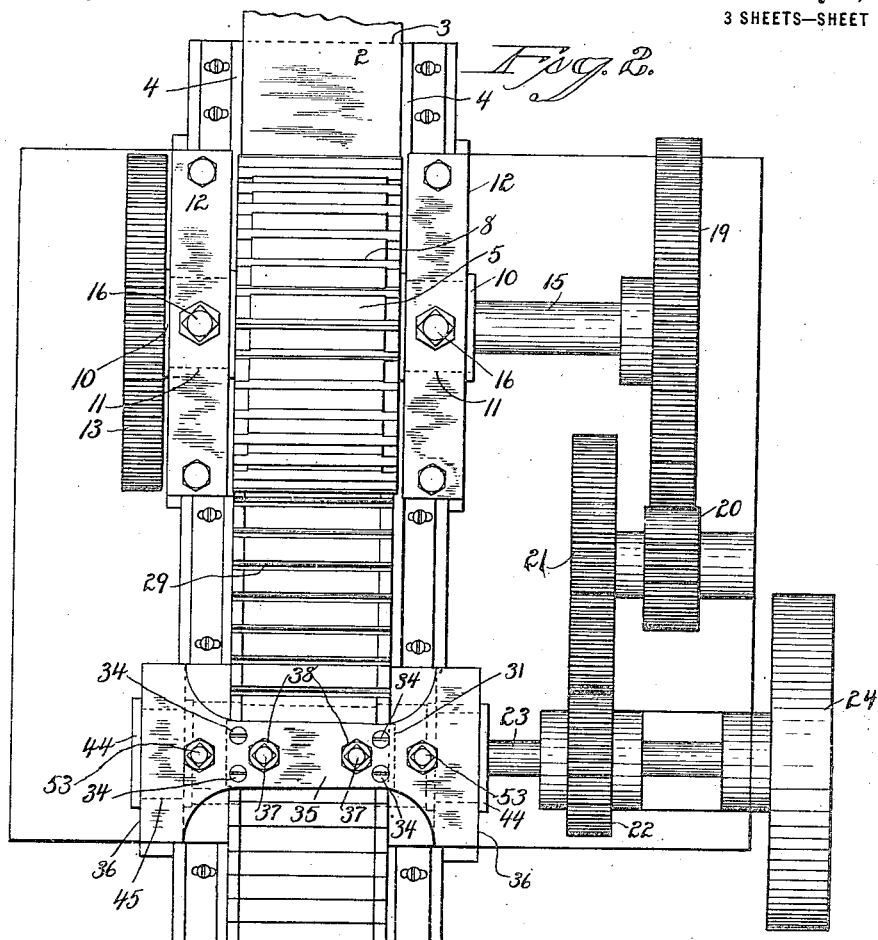

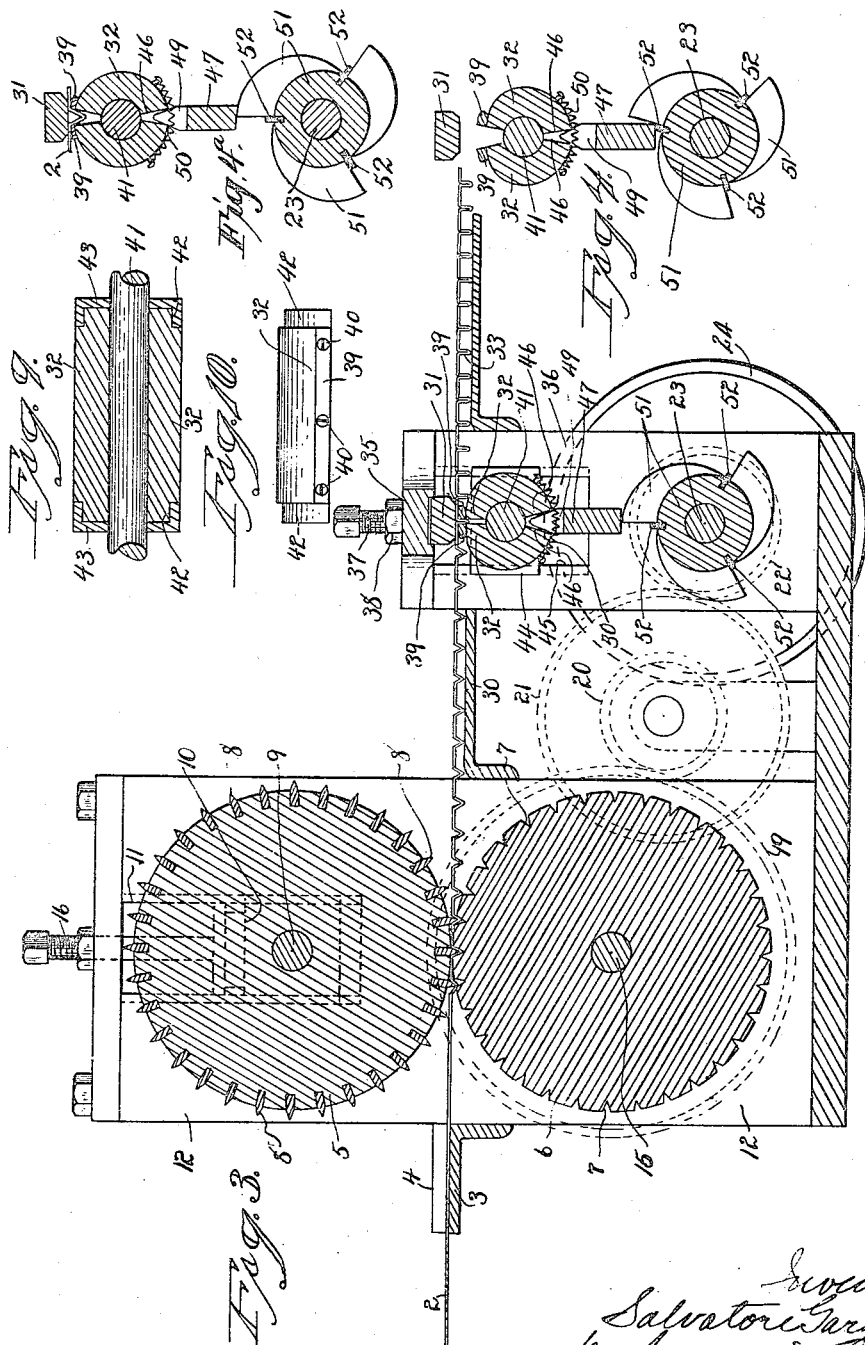

UNITED STATES PATENT OFFICE.

SALVATORE GARGIULO, OF NEW HAVEN, CONNECTICUT, ASSIGNOR TO THE G & O MANUFACTURING CO., OF NEW HAVEN, CONNECTICUT, A CORPORATION.

MACHINE FOR PRODUCING RADIATOR-TUBING FOR AUTOMOBILES.

1,225,730.  Specification of Letters Patent. Patented May 8, 1917.

Application filed August 19, 1915. Serial No. 46,393.

*To all whom it may concern:*

Be it known that I, SALVATORE GARGIULO, a subject of the King of Italy, residing at New Haven, in the county of New Haven and State of Connecticut, have invented a new and useful Improvement in Machines for Producing Radiator-Tubing for Automobiles; and I do hereby declare the following, when taken in connection with the accompanying drawings and the characters of reference marked thereon, to be a full, clear, and exact description of the same, and which said drawings constitute part of this application, and represent, in—

Figure 1 a view in elevation of the delivery end of a machine constructed in accordance with my invention, for producing radiator tubing for automobiles.

Fig. 2 a plan view thereof.

Fig. 3 a view of the machine in vertical, longitudinal section.

Fig. 4 a detail view in vertical section showing the rib-forming mechanism of the machine.

Fig. 4ᵃ a broken detail sectional view of the fold-closing mechanism, showing the same adjusted so as to only partially close the folds in the stock-strip.

Fig. 5 a broken detail view in side elevation showing a segment of the male fold-forming wheel.

Fig. 6 a detail, sectional view thereof on the line $a$—$b$ of Fig. 5, on an enlarged scale.

Fig. 7 a detached perspective view of one of the flanged washers employed for holding the dies in place in the male fold-forming wheel.

Fig. 8 a detached perspective view of one of the folding-dies.

Fig. 9 a detached view in horizontal section of the segmental rib-forming jaws and the means for mounting the same.

Fig. 10 a detached plan view of one of the jaws, showing its facing.

Fig. 11 a view in transverse section of the tubing on the line $c$—$d$ of Fig. 2.

Fig. 12 a detail view on an enlarged scale, showing a section of the sheet-metal stock after it has passed between the male and female fold-forming wheels for the formation of transverse V-shaped folds in it.

Fig. 13 a corresponding view, showing the stock after it has passed through the fold-closing or rib-forming mechanism of the machine.

My invention relates to an improved machine for producing from long strips of thin sheet-metal, what is known to the trade as radiator tubing for use in automobiles, aircraft, or wherever water-cooled internal combustion engines are employed, this product being ribbed and otherwise struck up so that when aggregated to form a radiator, it produces a honeycomb-like structure for the passage of air and water.

The object of my present invention is to make an improved machine for producing at a low cost a superior quality of the radiator tubing in question.

In carrying out my invention, a suitably wide stock-strip 2 of thin sheet brass is fed over a horizontal feed-table 3 having laterally adjustable side guides 4 applied to its upper face. From this table 3 the strip 2 passes between male and female fold-forming wheels 5 and 6, the latter being furnished upon its periphery with a regularly spaced series of transversely arranged V-shaped grooves 7 into which the metal of the strip is successively forced by V-shaped dies 8 mounted at corresponding distances apart in the periphery of the male fold-forming wheel 5 which is located directly above the female fold-forming wheel 6. The wheel 5 is mounted upon a shaft 9 journaled in vertically adjustable boxes 10 sliding in guideways 11 in the upper ends of the machine-frame uprights 12. The shaft 9 is provided at one end with a spur gear 13 meshing into a corresponding gear 14 on the shaft 15 of the female wheel 6. The wheel 5 is adapted to be adjusted by means of set screws 16.

The opposite end of the shaft 15, is furnished with a driving-wheel 19 (Fig. 2) meshing into a pinion 20 carried by a wheel 21 meshing into a pinion 22 on the main driving-shaft 23 which is furnished with a main driving-pulley 24.

As shown in Figs. 5, 6, 7 and 8, the dies 8 are held in place in the wheel 5 by means of flanged washers 25 secured in place by screws 26 and adapted to have their flanges 27 entered into inclined grooves 28 in the inner portions of the end walls of the dies 8, it being understood that the dies are held in place in pairs by a single washer at either end.

During the passage of the stock-strip 2 between the wheels 5 and 6, it is formed with regularly spaced V-shaped folds 29 produced one after the other. The strip is then fed over a horizontal feed-table 30 from which it passes between an anvil 31 and a pair of vertically movable and oscillating rib-forming jaws 32, 32, which jointly act upon the successive folds 29 to produce the ribs 33 of the finished product, the said anvil being located above the said jaws with a sufficient space between them for the passage of the stock-strip. The said anvil 31 is secured by screws 34 to the lower face of a cross-head 35 the ends of which rest upon uprights 36 fastened at their lower ends to the machine-frame. Anvil-adjusting screws 37 mounted in the cross-head 35 and furnished with lock-nuts 38 provide, in conjunction with the screws 34, for the vertical adjustment of the anvil 31 with respect to the jaws 32 which are furnished upon their upper edges with hardened jaw-facings 39 secured in place by screws 40. The jaws 32 are segmental in form and applied to a shaft 41 upon which they have, as it were, rocking movement for which purpose they are reduced at their outer ends as at 42 for being entered into and oscillating in retaining collars 43 mounted upon the shaft 41 the ends of which are supported in vertically movable boxes 44 riding in guide-ways 45 in the uprights 36 already mentioned. The lower edges of the segmental jaws 32 are formed with cam-faces 46 co-acting with the opposite faces of a wedge-like bar-cam 47 the ends of which enter guide-ways 48 in the uprights 36. The center of the cam 47 is formed with a notch 49 for the clearance of a spring 50 connecting the lower ends of the jaws 32 and exerting a constant effort to draw them together for the separation of their upper faces. The said cam 47 is positively lifted by two corresponding three-point cams 51, each furnished with three cushions 52 and mounted upon the driving-shaft 23 in position to engage directly with the lower edge of the said bar-cam. As the shaft 23 revolves, the points of the cams 51 bodily lift the bar-cam 47 which in turn bodily lifts the shaft 41, and consequently the jaws 32, until the collars 43 of the said jaws strike adjustable stop screws 53, the feeding of the stock-strip 2 being timed so that every time the bar 47 lifts the jaws 32, a fold 29 of the stock-strip 2 will be included between the upper ends of the jaws and their facings 39. The upward movement of the jaws 32 having now been stopped as described, with the stock-strip between them, the bar-cam 47 continuing to be lifted by the cams 51, forces itself between the jaws 32, 32, against the tension of the spring 50, whereby, the jaws 32 are turned upon the shaft 41 and within the collars 43, with the effect of separating their lower ends and closing their upper ends upon the fold 29 between them which is pinched to form a rib 33. After this has taken place, the engaged high points of the cams 51 pass the bar 47 which drops upon the cushions 52 located at the bottoms of the drops of the particular cam-points in play, whereby, the fall of the bar-cam 47 is broken. As the bar 47 descends, the shaft 41 also descends, and with it the jaws 32 which descend sufficiently below the plane of the stock-strip 2 to permit the same to be fed over it into position for the pinching into a solid rib 33 of the succeeding V-shaped fold 29. When the bar 47 drops off of the corresponding high points of the cam 51, springs 54 (Fig. 1) assert themselves to unwedge the bar from the cam-faces 46 of the jaws 32, giving the spring 50 an opportunity of turning the jaws 32 so as to spread their upper ends apart. The degree to which the folds 29 are closed in forming the ribs 33 is regulated by the said stop-screws 53, the position of which determines the point at which the pinching of the folds 29 for the formation of the ribs 33, begins. From this it follows that if the screws are set downward, the pinching action of the jaws will begin sooner and pinch to a greater degree, while on the other hand, if the screws are turned back and so set upward, the pinching operation will begin later and the pinching will be less.

It is apparent that the same effect could be secured by having only one of the jaws 32 mounted so as to oscillate. In that case the movable jaw would co-act with a corresponding but fixed jaw. It is also apparent that instead of moving the jaws in a vertical plane to clear the folds 29, the anvil 31 might be vertically moved for the same purpose.

I may add that the stock-strip 2 being thin and pliable, momentarily buckles sufficiently to take care of the brief stoppage of its feeding by the pinching action of the jaws 32, it being understoood that the male and female fold-forming wheels 5 and 6 turn continuously for the successive formation of the open V-shaped folds in the stock-strip 2. In this connection, I may point out that by the employment of male and female wheels for the initial folding of the metal, the folds are formed to all intents and purposes separately therein, so that the free end of the metal may be drawn upon to supply the additional metal required for the fold, without stretching the metal or tending to fracture it.

I claim:—

1. In a machine for making radiator tubing for automobiles and the like, the combination with means for producing folds in a stock-strip, of an anvil located on one side of the path in which said strip is fed, a pair of oscillating segmental jaws, a shaft movable toward and away from the said path and mounting the said jaws, a bar-cam co-acting directly with the said jaws for moving them into operative position and operating them in that position, and means for so operating the said bar-cam.

2. In a machine for making radiator tubing for automobiles and the like, the combination with means for producing folds in a stock-strip, of an anvil located on one side of the path in which the strip is fed, a pair of oscillating segmental jaws, a shaft movable toward and away from the said path and mounting the said jaws, a bar-cam co-acting directly with the said jaws to move the same into operative position and to operate them in that position, means for so operating the said bar-cam, and means for controlling the pinching action of the said jaws upon the folds of the stock-strip.

3. In a machine for making radiator tubing for automobiles and the like, the combination with means for producing open V-shaped folds in the stock-strip, of an anvil located above the path in which the said strip is fed, a vertically movable shaft located below the said path, oscillating segmental jaws applied to the said shaft by which they are carried, a bar-cam co-acting with the lower ends of the said jaws for forcing their upper ends together to operate upon the folds in the strip, and cams for operating the said bar-cam.

SALVATORE GARGIULO.